United States Patent [19]

Gyongyosi

[11] 4,085,508

[45] Apr. 25, 1978

[54] TWIN TEMPLATE CAM TRACKER

[76] Inventor: Josef Gyongyosi, P.O. Box 314, Southfield, Mich. 48075

[21] Appl. No.: 752,832

[22] Filed: Dec. 21, 1976

[51] Int. Cl.² .............................................. B26D 5/30
[52] U.S. Cl. .................................. 33/27 K; 90/13 B; 90/13.2; 144/144 R
[58] Field of Search ................. 33/27 K, 27 R, 23 H, 33/23 K, 30 B; 83/56 S; 90/13 B, 13.2; 118/317, 323; 144/142, 144 R, 144 A, 144.5

[56] References Cited

U.S. PATENT DOCUMENTS

| | | | |
|---|---|---|---|
| 1,172,933 | 2/1916 | Bucknam | 33/27 K |
| 3,047,953 | 8/1962 | Billinger | 33/27 K |
| 3,537,345 | 11/1970 | Luppino | 144/144 |

FOREIGN PATENT DOCUMENTS 231,969  4/1959  Australia ................. 83/565

*Primary Examiner*—Richard E. Aegerter
*Assistant Examiner*—John W. Shepperd
*Attorney, Agent, or Firm*—Clarence A. O'Brien; Harvey B. Jacobson

[57] ABSTRACT

Structure for following a cam pattern for moving or retaining a tool, workpiece or the like in predetermined relation to a cam surface including a master cam having a peripheral cam surface defining a pattern of movement for a tool, workpiece or the like engaged by a roller or cam follower which is driven for moving a tool, workpiece or the like in accordance with the pattern on the stationary master cam together with a control cam or member stationarily spaced from the master cam and including a pattern defined thereon in opposed relation to the pattern defined on the master cam. A control cam follower is supported in a spring biased manner to engage the control cam and is associated with the master cam follower to retain it in engagement with the master cam without binding and to provide accurate movement of the tool, workpiece or the like in accordance with the cam pattern on the master cam.

4 Claims, 7 Drawing Figures

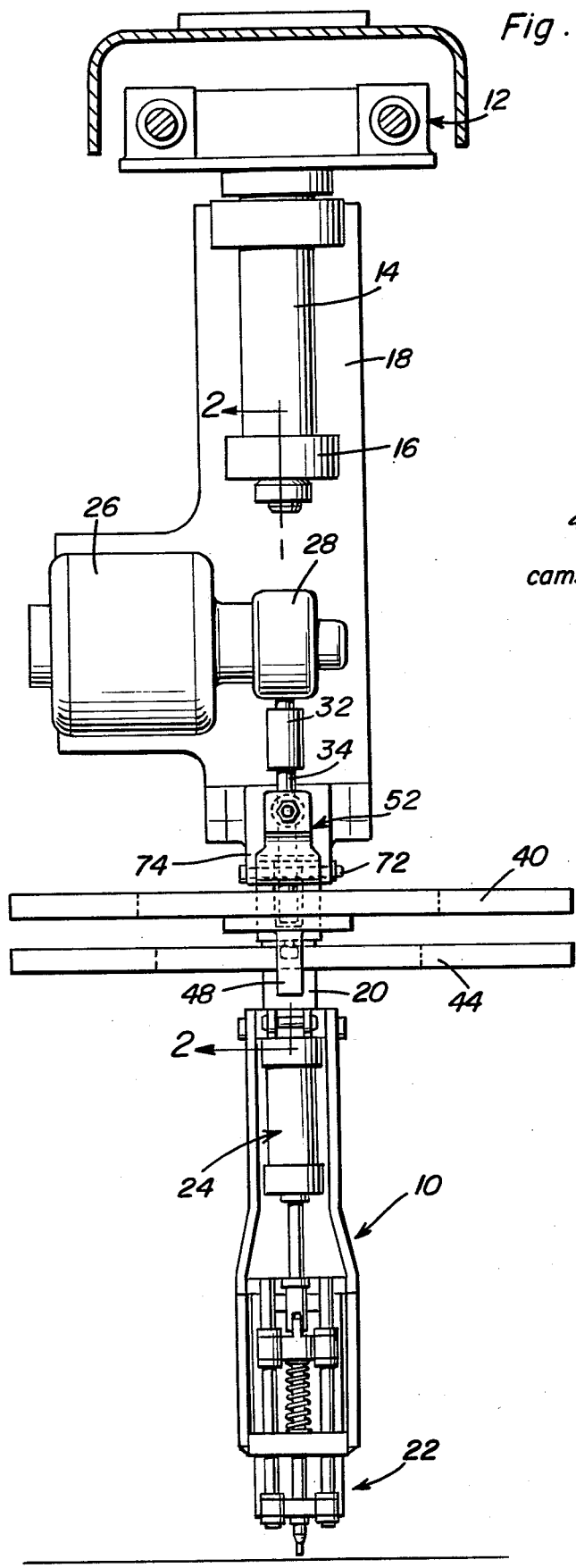
Fig. 1
Fig. 4
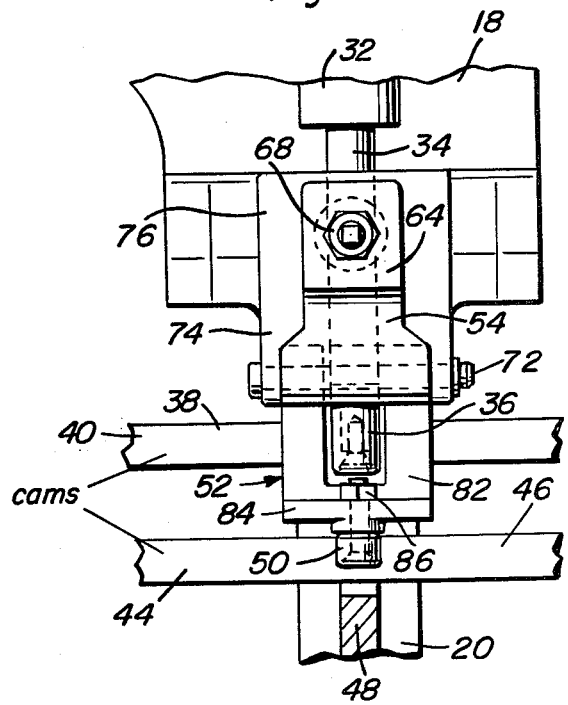
Fig. 5
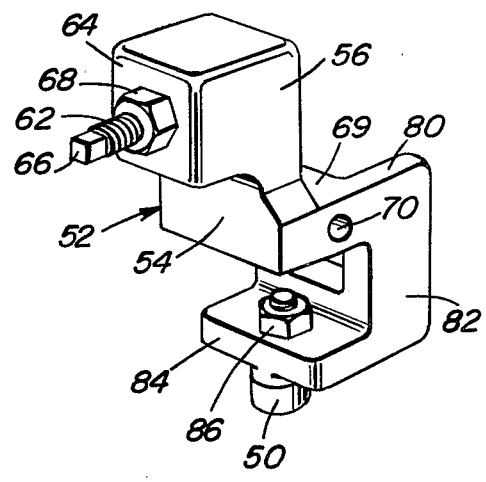

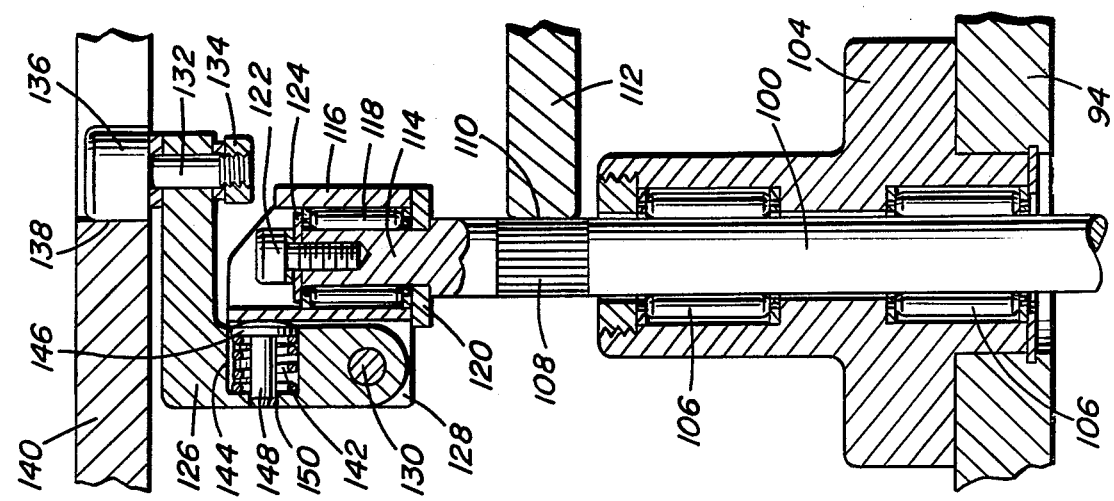
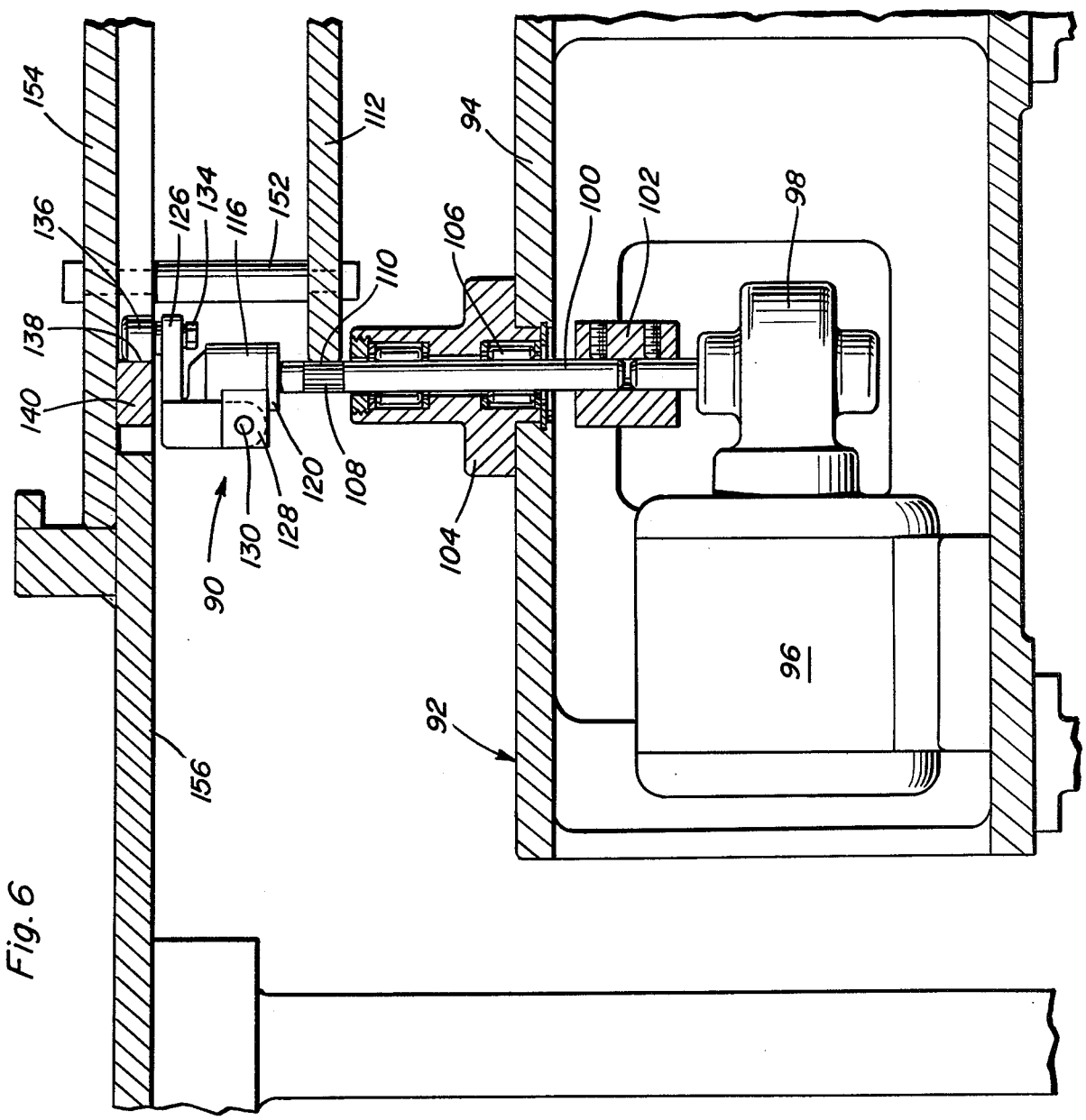

TWIN TEMPLATE CAM TRACKER

BACKGROUND OF THE INVENTION

1. Field of the Invention

The present invention generally relates to a structure for supporting and controlling movement of a tool, workpiece or the like in accordance with a pattern formed on the peripheral surface of a cam in which a driven cam follower engages the cam surface on a stationary cam and a control member having a cam surface thereon is engaged by a control cam follower in which the cam surfaces or templates are opposed to each other with the control cam follower being spring biased toward the control cam surface in order to maintain a constant relationship between the master cam surface and the driven cam follower engaged therewith.

2. Description of the Prior Art

Master templates, cams, pattern defining surfaces, and the like are employed to control the movement of various machines, tools, workpieces and the like with one type of such device including a stationary cam surface or template engaged by a driven cam follower which is associated with a supporting mechanism for the element to be moved in a predetermined pattern as the supporting mechanism and driven cam follower moves peripherally of the template or cam surface. One of the problems which exist in this type of device is maintaining proper contact between the template or cam surface and the driven cam follower. Spring devices and the like have been employed for this purpose and the following U.S. Pats. Nos. are exemplary of the development in this art:

| | |
|---|---|
| 2,045,586 | 2,270,462 |
| 2,156,847 | 3,555,944 |

SUMMARY OF THE INVENTION

An object of the present invention is to provide a cam tracker in which twin templates or cam surfaces are provided to engage opposed surfaces of axially spaced cam followers in which one of the cam surfaces or templates is a master cam and the other is a control cam with the follower engaging the master cam being driven and the follower engaging the control cam being spring biased in engagement therewith.

Another object of the invention is to provide a cam tracking device in accordance with the preceding objects in which a supporting structure is provided for the spring biased cam follower in which a compression spring is adjustably supported in order to vary the force exerted on the spring biased cam follower.

Still another object of the invention is to provide a twin template cam tracker in accordance with the preceding objects especially adapted for use in supporting and moving a material applying or dispensing gun for automatically applying material in a predetermined cam pattern in an automatic or manual operating mode. Still another important object of the present invention is to provide a cam tracker in accordance with the preceding objects which is effective for its purposes, long lasting and relatively inexpensive to manufacture, operate and maintain.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of a machine utilizing the twin template cam tracker of the present invention.

FIG. 4 is a fragmental elevational view taken generally along reference line 4—4 on FIG. 2 illustrating further structural association of the components of the invention.

FIG. 5 is a perspective view of the supporting structure for the control cam follower.

FIG. 6 is a fragmental elevational view of another embodiment of the cam tracker.

FIG. 7 is a sectional view of the structure of FIG. 6 illustrating the specific structural details thereof.

DESCRIPTION OF THE PREFERRED EMBODIMENT

Figures 2, 3:
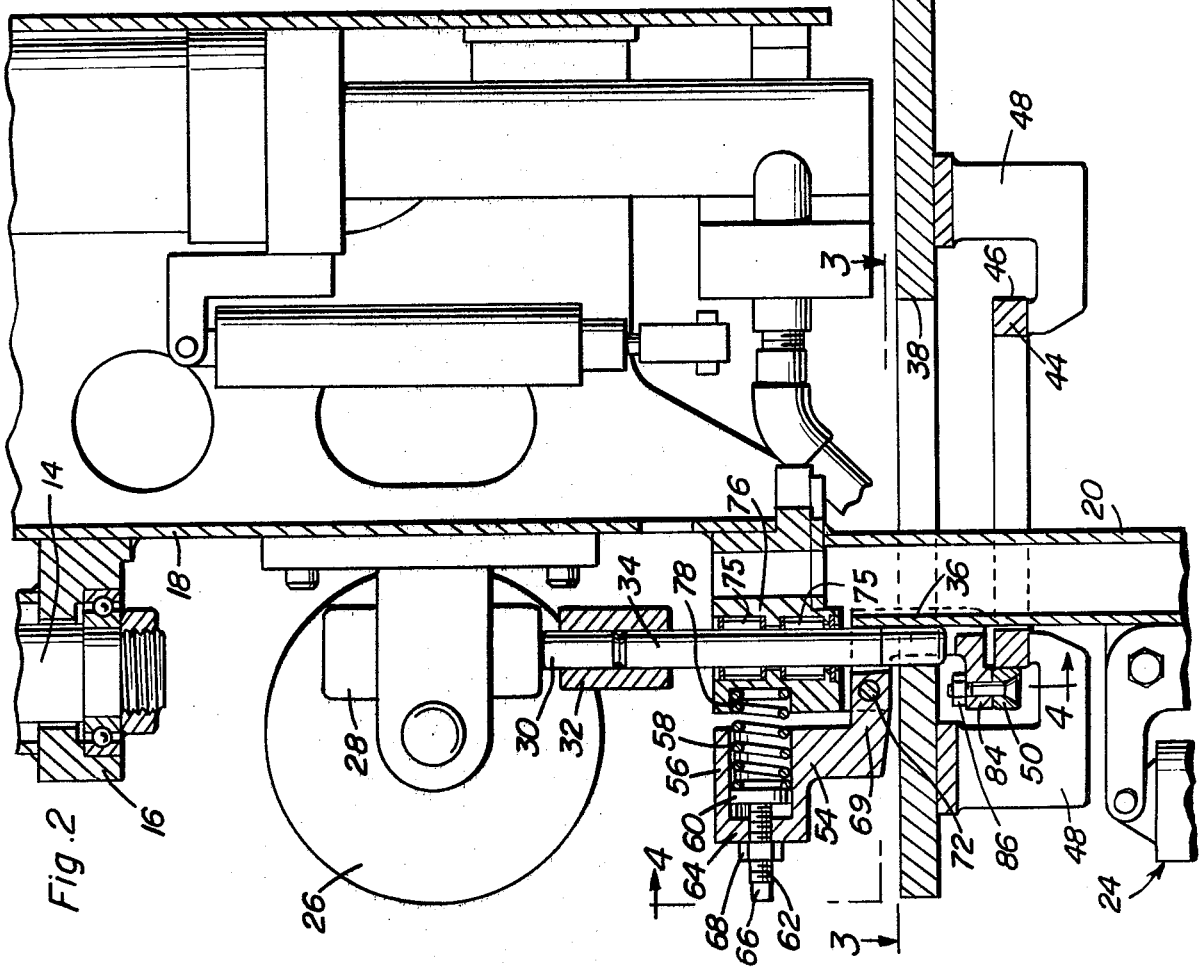
FIG. 2 is a vertical sectional view, on an enlarged scale, taken substantially upon a plane passing along section line 2—2 of FIG. 1 illustrating further structural details of the cam tracker.
FIG. 3 is a transverse, sectional view taken substantially upon a plane passing section line 3—3 on FIG. 2 illustrating further structural details of the dual templates or cams and associated structure.

The cam tracker of the present invention is disclosed in association with a dispensing gun such as is employed in applying gasket material, mastic or the like to a surface in which the dispensing machine generally designated by numeral 10 is supported for translatory movement by suitable slide structure 12 and pivotal movement by vertical pivot shaft 14 and bearing assemblies 16 which support a vertical plate or housing 18 which includes a depending structure 20 extending to a dispensing gun generally designated by numeral 22 or the like which can be vertically reciprocated or moved in any suitable manner by a piston and cylinder assembly 24. The specific structure of the machine forms no particular part of the invention and the cam tracker of the present invention may be employed with various types of machines, tools, workpieces or the like for controlling a pattern of movement.

The housing 18 includes a drive motor 26 mounted thereon connected to a reduction gear assembly 28 and provided with a downwardly extending drive shaft 30 provided with a flexible coupling 32 with the lower portion of the drive shaft being designated by numeral 34 and including a cam follower 36 on the lower end thereof which is driven in a rotatable manner and in engagement with the cam or template surface 38 of a stationary template or cam 40 supported by suitable support structure 42 with the cam surface 38 being in the form of an internal cam surface with FIG. 3 illustrating the rectangular or square configuration of the cam surface 38 with it being pointed out that this configuration may be of any suitable pattern necessary for the particular requirements of the machine, tool, workpiece or the like with which the present invention is associated.

With this construction, operation of the motor 26 will cause the shaft 34 and cam follower 36 to be rotated and the cam follower 36 will follow or track around the cam surface 38.

Supported below the master cam 40 is a control cam or member 44 having an external peripheral pattern or cam surface 46 thereon which is the same shape and pattern as the master cam surface 38 and is of annular construction with the support 20 extending therethrough. The control cam 44 is supported from the master cam 40 by support brackets 48 which maintain the control cam 44 in spaced parallel relation below the master cam 40 with the support brackets being generally illustrated and supporting the control cam 44 from the undersurface thereof and outwardly thereof thereby leaving the peripheral pattern or cam surface 46 free to be engaged by a control cam follower 50 in the form of a roller which is rotatably supported from the lower end of a control cam follower support generally designated by numeral 52.

The control cam follower support is in the form of a mounting member or casting 54 having a hollow, vertically disposed upper body portion 56 receiving a compression coil spring 58 therein with the spring being received in a cavity in the hollow portion 56 and engaged by an abutment 60 on one end of a threaded member 62 which is screw threaded through an end wall 64 of the hollow portion 56. The screw threaded member 562 is provided with a polygonal end portion 66 to receive a suitable wrench or the like in order to rotate the threaded member when a lock nut 68 is loosened thereby enabling the spring 58 to be adjusted by threading the abutment 60 inwardly or outwardly of the cavity which receives the spring. The central portion of the casting 54 includes a laterally extending member 69 having a bore 70 extending therethrough for receiving a pivot pin or bolt 72 which also extends through depending lugs 74 integral with a housing or casting 76 connected with the housing 18 in which the casting 76 is provided with bearings 75 engaging shaft 34 in a manner similar to that in FIG. 6 and a socket or recess 78 receiving the end of the spring 58 in opposed relation to the abutment 60 as illustrated in FIG. 2. The horizontal portion 69 of the control cam follower support 52 includes a pair of extensions 80 which straddle the drive shaft 34 and terminate in downwardly extending legs 82 which extend along side of opposite sides of the driven cam follower 36 to a point below the master cam 40 as illustrated in FIG. 2. The lower ends of the legs 82 are interconnected by a horizontal portion 84 paralleling the horizontal portion 69 and extending laterally above the control cam 44 with a bolt 86 extending therethrough and forming a rotatable support for the control cam follower 50. Thus, by adjusting the screw threaded member 62, the control cam follower 50 is spring biased toward the cam surface 46 on the control cam 44 with adjustment of the compression spring 58 varying the force with which the follower 50 is biased toward the cam surface 46.

The follower 50 being spring biased toward the cam surface 46 about the pivot pin 42 exerts a force on the pivot pin 42 that counteracts the forces exerted on the shaft 34 by the driven roller 36 which, in effect, is cantilever supported on the end of the shaft 34 thus maintaining more effective driving engagement between the roller or follower 35 and the master cam surface or pattern 38. Without the roller 50, the control cam 44 and the control cam follower support 52, the driven roller 36 will tend to deflect the shaft 34 since the shaft 34, in effect, forms a cantilever support for the driven roller. This enables the roller or follower 36 to climb the master cam surface 38 as the housing and other supported structure moves in the pattern defined by the master cam surface 38. This tendency of the roller 36 to climb laterally or vertically on the surface 38 renders the driving engagement somewhat ineffective and also causes binding, excessive friction and wear between the rotating components and the stationary components. The use of the second template or cam surface and its associated spring biased follower which is supported from the support structure for the shaft 34 counteracts the cantilever forces exerted on the shaft 34 by the roller or follower 36 in order to properly maintain the driven roller or follower 36 in accurate contact with the master template or cam surface 38.

The arrangement of components may vary depending upon particular installational requirements. For example, FIGS. 6 and 7 illustrate a modified form of the cam tracker generally designated by numeral 90 which represents an inverted arrangement that includes a support structure generally designated by numeral 92 to enable a tool, workpiece or the like to be moved in a predetermined pattern as determined by pattern cams. The specific structure of the mechanism for supporting the cam tracker 90 and supporting the tool, workpiece or the like is not illustrated since this structure may take any desired form or configuration. The support structure includes a housing 94 supporting a motor 96 having an output gearbox 98 driving a drive shaft 100 through a coupling 102 which may be similar to the coupling 32 in the embodiment illustrated in FIGS. 1-5. The driven shaft 100 is supported and journaled by a bearing assembly 104 which includes a pair of longitudinally spaced roller bearing or needle bearing assemblies 106. The upper end portion of the drive shaft 100 includes a driven roller or master cam follower 108 which is in driving contact with the cam surface 110 on a stationary master cam 112 in the same manner as the driven follower 36 is in engagement with the cam surface 38 of the master cam 40 in FIGS. 1-5. The follower 108 is an integral part of the drive shaft 100 and may be roughened or otherwise provided with a surface which enhances the driving engagement between the follower 108 and the cam surface 110.

The upper end of the shaft 100, above the cam follower 108, is provided with a reduced end portion 114 having a housing or casting 116 mounted thereon and rotatable in relation thereto by a roller or needle bearing assembly 118. The lower end of the housing or casting 116 includes an inwardly extending flange 120 which rests against the shoulder defined by the juncture between the reduced end portion 114 and the remainder of the shaft 100. The casting 116 is retained in place on the end of the shaft 100 by a cap screw 122 threaded into the end of the shaft 100 and engaging a retaining plate 124 which retains the bearing assembly 118 and the casting 116 rotatably on the end of the drive shaft 100. This structure enables the drive shaft 100 to be driven by the motor 96 with the casting 116 remaining stationary insofar as rotation is concerned.

Pivotably supported from the casting 116 is an L-shaped mounting member 126 which has a vertically disposed portion extending between a pair of lugs 128 on the casting 116 and receiving a pivot pin or bolt 130 therethrough adjacent the lower end of the vertical portion of the mounting member 126. The horizontal leg of the L-shaped mounting member 126 extends into overlying relation to the cap screw 122 as illustrated in FIG. 7 and the free end thereof supports a shaft 132 therethrough with a retaining nut 134 detachably but fixedly securing the shaft 132 in place. The upper end of the shaft 132 extends above the L-shaped mounting member 126 and rotatably journals a control cam roller or follower 136 which engages the cam surface 138 of a control cam or member 140 in the same relationship as the engagement between the control cam follower 50 and the cam surface 46 on the control cam 44 in FIGS. 1–5.

In order to bias the control cam follower 136 into engagement with the control cam surface 138, a coil compression spring 142 is disposed within a recess 144 in the inner surface of the vertical portion of the L-shaped mounting member as illustrated in FIG. 7. One end of the spring 142 abuts against the bottom of the recess 144 and the other end of the spring abuts against the undersurface of an enlarged head 146 on a reciprocal guide rod 148 which extends through the center of the spring 142 and is received in a guide aperture 150 in the bottom of the recess 144 as illustrated in FIG. 7. The head 146 of the guide rod 148 is rounded on its outer end and is in engagement with the external surface of the casting 116 adjacent its upper end and in spaced relation to the pivot bolt or pin 130 thus biasing the L-shaped mounting member 126 in a counterclockwise direction as observed in FIG. 7 thereby biasing the control cam follower 136 against the control cam surface 138 for maintaining contact therebetween.

The control cam follower 136 being spring biased toward the cam surface 138 will exert a force on the casting 116 and thus on the drive shaft 100 which counteracts the forces exerted on the drive shaft 100 by the driven cam follower or roller 108. Since the cam follower or roller 108 is cantilever supported on the end portion of the drive shaft 100, the counter action force exerted by the spring biased control cam follower 136 will maintain more effective driving engagement between the driven cam roller or follower 108 and the cam surface 110. The spring biased control cam follower 136 overcomes the tendency of the drive shaft 100 to deflect laterally which tends to cause the driven cam follower or roller 108 to climb or move laterally on the cam surface 110 as the housing and support structure 92 move in the pattern defined by the master cam surface 110. Thus, this embodiment of the invention operates in substantially the same manner as that illustrated in FIGS. 1–5 except that the drive structure and support structure are all below the master cam and the control structures. This enables a simplified support for the master cam 112 since it may be supported from the control cam 140 in spaced relation by supporting bolts 152 or the like which may have spaces thereon with the cam structures being supported from a support plate 154 which may be interchangeably positioned on a supporting ledge structure 156 to enable change of the cams for varying the pattern of movement for the tool, workpiece or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cam tracker comprising a master cam having a master cam surface thereon, means supporting said master cam, a master cam follower, a drive shaft supporting said cam follower in rolling contact with said cam surface on said master cam, means rotatably supporting said drive shaft, drive means connected with said drive shaft for rotating the drive shaft and cam follower thereby moving the cam follower and cam surface in relation to each other, a control cam having a control cam surface thereon, means supporting said control cam in axially spaced, fixed relation to the master cam with the control cam surface being in radially opposed relation to the master cam surface, a control cam follower, means supporting said control cam follower in rolling contact with said control cam surface with the control cam follower being freely rotatably supported by its supporting means, said supporting means for the cam follower including a movable mounting member rotatably journaling said control cam follower, housing means, rotatably connected to said drive shaft means movably supporting said mounting member from said housing means, and spring means connected between said mounting member and said housing means to resiliently bias the mounting member in one direction to resiliently retain the control cam follower in rolling contact with the control cam surface and to resiliently bias said master cam follower in the opposite direction into rolling contact with said master cam.

2. The structure as defined in claim 1 wherein said master cam surface and control cam surface are in axial alignment and are stationarily supporting with the cam followers moving along the cam surfaces when the master cam follower is rotatably driven.

3. The structure as defined in claim 2 wherein said housing means is mounted directly on said drive shaft axially outwardly of said master cam follower, bearing means supporting the housing means from the drive shaft to enable the housing means to remain stationary during rotation of the drive shaft, said means supporting the mounting member from the housing means including a transverse pivot means supporting the mounting member from the housing means for pivotal movement about an axis transverse to the rotational axis of the drive shaft, said spring means including a compression coil spring between the mounting member and housing means to bias the mounting member in one direction about the pivot means, said control cam follower including a roller journaled on the mounting member with the axis of rotation generally paralleling the drive shaft whereby lateral forces exerted on the cam followers by the cam surfaces will be in opposition to each other.

4. The structure as defined in claim 2 wherein said housing means is mounted on the supporting means for said drive shaft axially of said master cam follower, said means supporting the mounting member from the housing means including a transverse pivot means supporting the mounting member from the housing means for pivotal movement about an axis transverse to the rotational axis of the drive shaft, said spring means including a compression coil spring between the mounting member and housing means to bias the mounting member in one direction about the pivot means, said control cam follower including a roller journaled on the mounting member with the axis of rotation generally paralleling the drive shaft whereby lateral forces exerted on the cam followers by the cam surfaces will be in opposition to each other.

* * * * *